United States Patent [19]

Pickles

[11] Patent Number: 4,777,847
[45] Date of Patent: Oct. 18, 1988

[54] AXIAL DRIVE MECHANISM

[75] Inventor: Joseph Pickles, Troy, Mich.

[73] Assignee: Ferro Manufacturing Corporation, Southfield, Mich.

[21] Appl. No.: 82,941

[22] Filed: Aug. 4, 1987

Related U.S. Application Data

[63] Continuation of Ser. No. 813,800, Dec. 27, 1985, abandoned.

[51] Int. Cl.⁴ ............................................. F16H 1/28
[52] U.S. Cl. ........................................ 74/797; 74/788
[58] Field of Search ................... 74/785, 788, 797, 801

[56] References Cited

U.S. PATENT DOCUMENTS

| | | | |
|---|---|---|---|
| 1,232,004 | 7/1917 | Cotterman | 74/797 X |
| 1,276,855 | 8/1918 | Apple | 74/797 |
| 1,567,933 | 12/1925 | Fahnestock | 74/801 |
| 2,349,642 | 5/1944 | Watson | 74/797 X |
| 2,564,271 | 8/1951 | Millns | 74/785 |
| 2,791,920 | 5/1957 | Ray | 74/785 X |
| 2,900,848 | 8/1959 | Henn-Collins | 74/785 X |
| 3,456,528 | 7/1969 | Maruyama | 74/785 |
| 3,570,815 | 3/1971 | Nelson | 74/801 |
| 3,872,742 | 3/1975 | States | 74/785 |
| 4,133,344 | 1/1979 | Hunter et al. | 74/785 X |
| 4,468,985 | 9/1984 | Nilsson | 74/788 X |
| 4,521,055 | 6/1985 | Fudala | 74/788 |
| 4,671,125 | 6/1987 | Yabunaka | 74/801 |

FOREIGN PATENT DOCUMENTS

| | | | |
|---|---|---|---|
| 720040 | 4/1942 | Fed. Rep. of Germany | 74/801 |
| 59-54844 | 3/1984 | Japan | 74/801 |

Primary Examiner—Lawrence Staab
Attorney, Agent, or Firm—Harness, Dickey & Pierce

[57] ABSTRACT

An axial drive mechanism consisting of a worm gear, a first planetary gear system having a carrier, helical planet gears in meshing engagement with the worm gear and mounted on the carrier, and a ring gear on the carrier. An electric motor can be used to drive the worm gear and a second planetary gear system can be arranged in a coaxial relation with the first system to achieve a desired gear reduction while retaining the axial arrangement of the drive. The second planetary gear system has planet spur gears arranged about and in meshing engagement with the first ring gear and a secondary ring gear encircling the planet spur gears. The second planetary gear system includes a carrier on which the planet spur gears are mounted and an output pinion gear formed integral with the last mentioned carrier. The stationary ring gear is conveniently formed as a part of the housing for the electric motor.

5 Claims, 3 Drawing Sheets

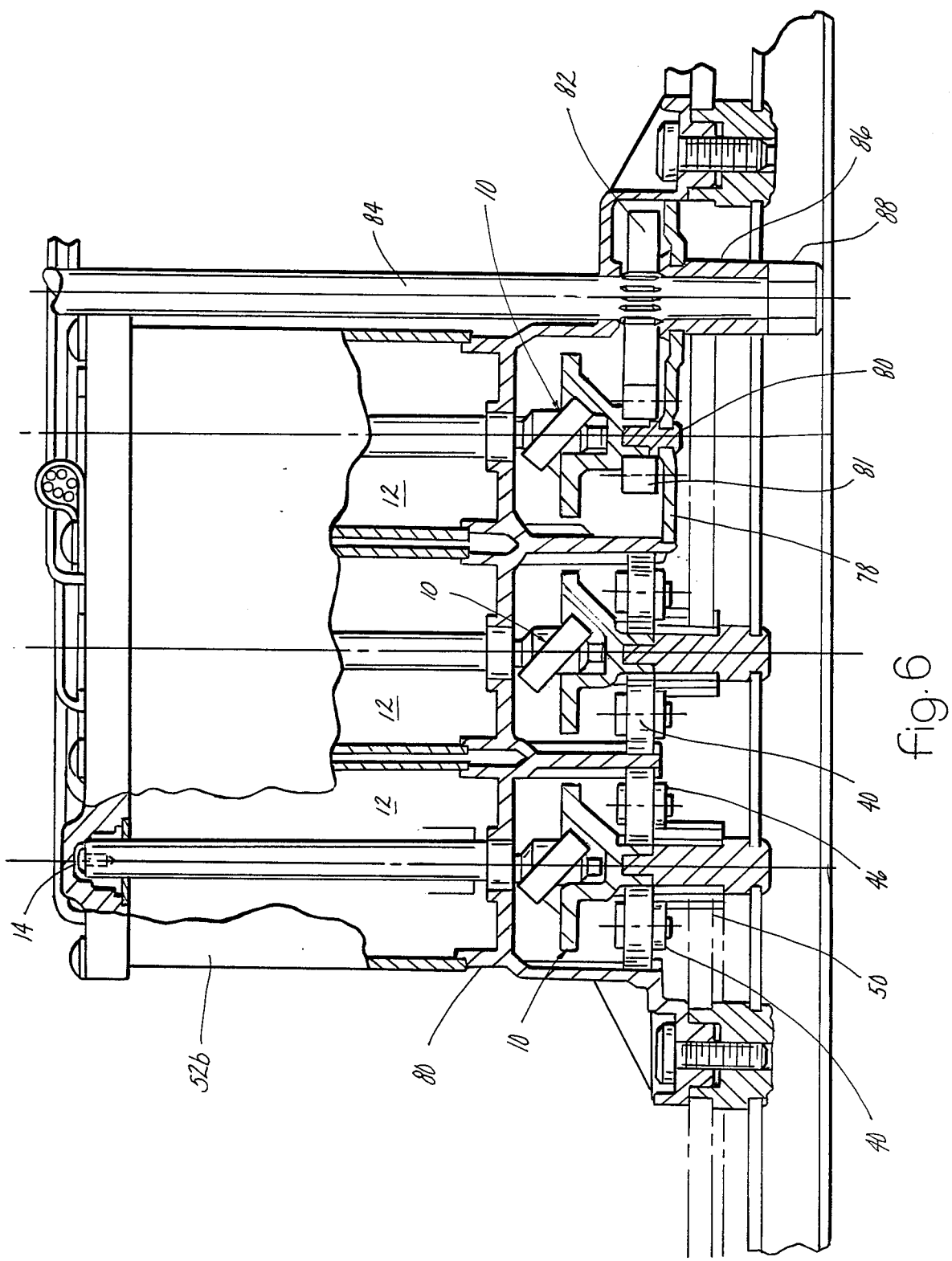

AXIAL DRIVE MECHANISM

This is a continuation of U.S. patent application Ser. No. 813,800, filed Dec. 27, 1985 for a AXIAL DRIVE MECHANISM, abandoned.

BACKGROUND AND SUMMARY OF THE INVENTION

This invention relates generally to drive mechanisms and more particularly to an axial drive mechanism that has the advantage of being compact and can thus be used in installations, such as adjustable seat mechanisms, where space availabilities limit the size and shape of the drive mechanism that can be used. The drive mechanism is conveniently driven by an electric motor with a coaxial drive shaft but it can also be driven by a remote drive.

The axial drive assembly of this invention includes a worm gear, a planetary gear system having a carrier, helical planet gears mounted in inclined positions on the carrier in meshing engagement with the worm gear, and a ring gear which is formed integral with the carrier, the planetary gear system being in a coaxial relation with the worm gear. The ring gear can then be used to drive a variety of other mechanisms.

A second planetary gear system having planet spur gears arranged about and in meshing engagement with the first ring gear can be disposed in axial alignment with the first planetary gear system to obtain a further gear reduction. The second planetary gear system includes a stationary ring gear which encircles the planet spur gears and is integrally formed with the housing for the drive assembly. The second planetary gear system also includes a carrier on which the planet spur gears are mounted and an output pinion gear that is formed integral with the last mentioned carrier.

The drive shaft, worm gear, carriers and ring gears are in substantial axial alignment to thereby confine the transverse dimension of the drive assembly. In one embodiment of the invention, this dimension is substantially the same dimension as the transverse dimension of an electric motor used to drive the worm gear.

It can thus be seen that in the drive mechanism of this invention, the two planetary gear systems are structured and arranged so that they are coaxial with each other and with the worm gear and operate to provide an output which is of reduced speed and of increased torque relative to the output from the electric motor drive shaft. Such a drive assembly has applicability to numerous mechanical environments wherein components must be selectively moved.

Further objects, features and advantages of the invention will become apparent from a consideration of the following description and the appended claims when taken in connection with the accompanying drawing in which:

FIG. 6 is a side elevational view, like FIG. 4 of a three motor drive assembly embodying the drive mechanism of this invention.

Figure 1:
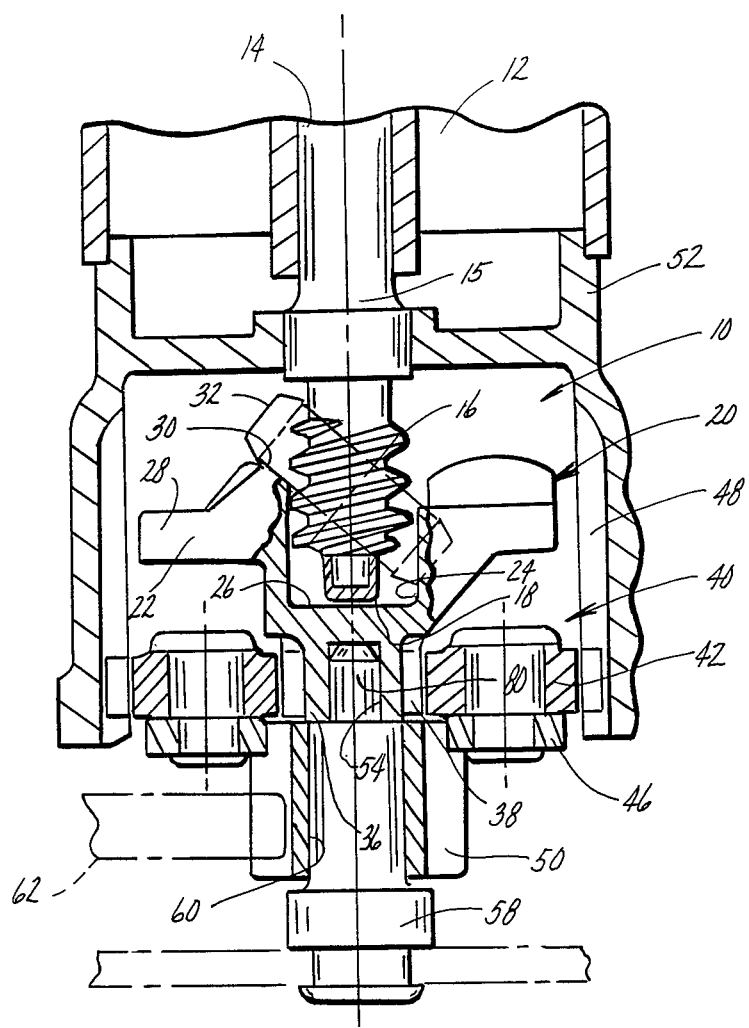
FIG. 1 is a fragmentary longitudinal sectional view of one embodiment of the axial drive mechanism of this invention in which the worm gear is driven by a coaxially arranged drive shaft with some parts broken away and other parts shown in section for the purpose of clarity.
Figure 5:
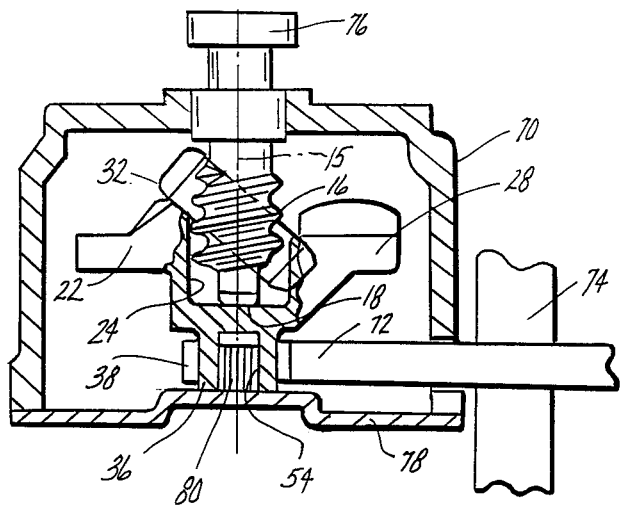
FIG. 5 is a longitudinal sectional view of another embodiment of the drive mechanism of this invention.

With reference to the drawing, the axial drive mechanism of this invention, indicated generally at 10, is shown in FIGS. 1 and 5 as including a worm gear 16 having an axis 15 and a planetary gear system 20. The planetary gear system 20 is positioned in a driven relation with the worm gear 16 and includes a carrier 22 of irregular shape. The carrier 22 has a central cavity 24 and is positioned so that the worm gear 16 extends into the cavity 24.

Figure 3:
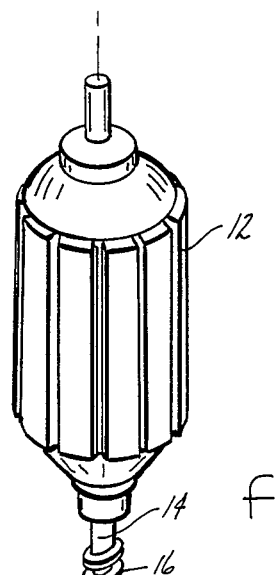
FIG. 3 is an exploded perspective view of the axial drive mechanism of this invention shown in FIG. 1, with the housing therefor removed for the purpose of clarity.

An annular gear support section 28 surrounds the cavity 24 and encircles the worm gear 16. This gear support section 28 includes a plurality of support surfaces 30 (FIG. 3), shown as three in number, which are inclined at an angle of substantially 45° to the axis 15 of the worm gear 16. A plurality of helical planet gears 32, shown as three in number, are mounted on the support surfaces 30 as shown in FIG. 3 so that the teeth on the gears 32 will mesh with the teeth on the worm gear 16.

Each of the gears 32 rotates about a shaft 34 carried by the carrier 22 and located so that the gear 32 can be positioned substantially flat against the inclined surface 30. As a result, the gears 32 are likewise inclined at an angle of about 45° to the axis 15.

The carrier 22 has an extension 36 which extends axially away from the cavity 24 and is provided with integral teeth forming a ring gear 38.

An electric motor 12 having an axial drive shaft 14 formed integral with the worm gear 16 is shown in FIG. 1 for driving the worm gear 16 about the axis 15. Axially beyond the worm gear 16, the drive shaft 14 terminates in a thrust or bearing portion 18 which engages the bottom wall 26 of the carrier cavity 24.

A second planetary gear system 40 is shown in FIG. 1 axially aligned with the worm gear 16 and the axial drive mechanism 10. The system 40 has a plurality of spur gears 42 arranged about and in meshing engagement with the ring gear 38 in the planetary system 20. The spur gears 42 rotate about shafts 44 mounted on a carrier 46 (FIG. 3). A stationary ring gear 48 is formed as an integral part of the housing 52 for the mechanism 10 and is in meshing engagement with the teeth on the planet gears 32 and the spur gears 44. An output pinion gear 50 is formed integral with the carrier 46 and is located in a coaxial relation with the shaft 14.

FIG. 5 illustrates an embodiment of the invention in which the axial drive mechanism 10 is mounted in a housing 70 and the ring gear 38 is in a driving relation with a gear 72 that drives a shaft 74. The worm gear 16 is bearing supported on the carrier 22 and the housing 70 and is connected through a coupling 76 to a remote power source such as a motor (not shown). A bottom plate 78 on the housing 70 carries a spindle 80 that extends into a central bore 54 in the ring gear 38 and rotatably supports the carrier 22.

From the above description, it is seen that this invention provides an axial drive mechanism 10 which includes a worm gear 16 and an axially aligned planetary gear system 20. In the embodiment shown in FIGS. 1-4, a second planetary gear system 40 is interconnected and arranged in a driven relation with the planetary 20 so that the high speed, low torque output of the shaft 14 is translated into a low speed, high torque output of the pinion gear 50. The drive torque of the worm gear 16 provides the force that moves the pinion gear 50 and the stationary ring gear 48 provides the reaction force from which the drive force for the pinion gear 50 is generated.

As shown in FIG. 1, the drive mechanism 10 is of a compact size and of a small dimension in a direction transversely of the motor drive shaft 14 so that the transverse dimension of the mechanism 10 does not substantially exceed the transverse dimension of the motor 12. This enables use of the drive mechanism 10 in mechanical environments in which space is limited.

Figure 4:
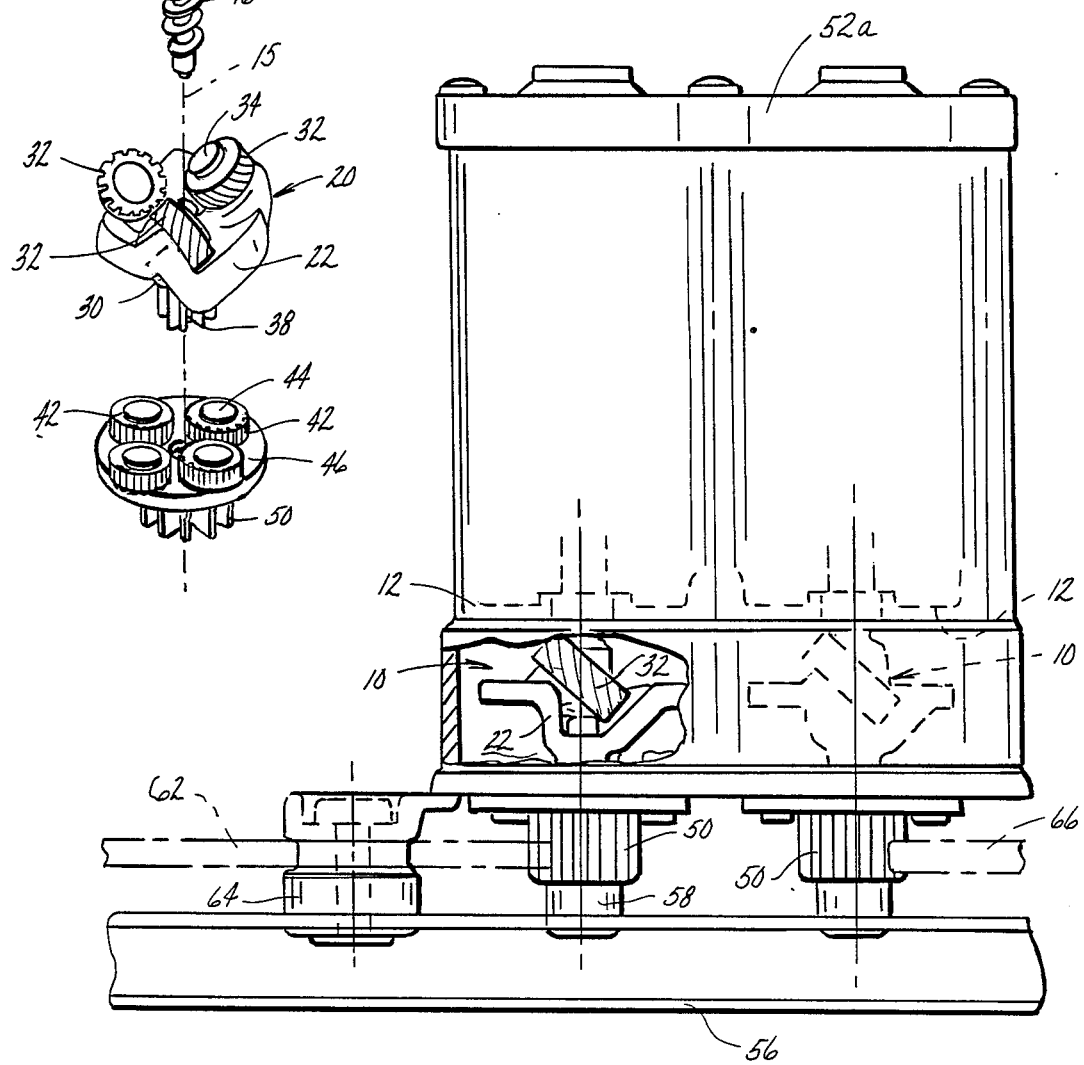
FIG. 4 is a fragmentary side elevational view of the axial drive mechanism of this invention shown in FIG. 1, shown mounted on a support rail and as part of a two motor drive assembly.

In the assembly 55 illustrated in FIG. 4 utilizing drive mechanisms 10, a pair of motors 12 are arranged side-by-side in a common housing 52a and the drive mechanisms are supported on a rail 56. Mounting members 58 are mounted at their lower ends on the rail 56 and at their upper ends have support spindles 80 that are telescoped into the central bore 54 in the ring gear 36 and a coaxial bore 60 in the output pinion gear 50. The connectors 58 thus constitute supports for the axial drive mechanisms 10.

Figure 2:
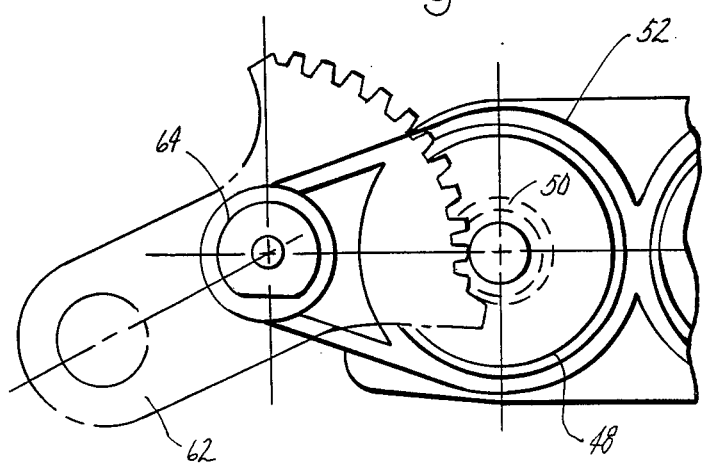
FIG. 2 is a bottom view of the assembly shown in FIG. 1, on a reduced scale, showing a driven member in assembly relation with the output gear in the mechanism.

As shown in FIGS. 2 and 4, a geared lever 62 can be mounted on a support 64 on the rail 56 so that it is in meshing engagement with the output pinion 50 for driving the lever 62 back and forth about its pivot 64. Similarly, the pinion gear 50 on the adjacent drive mechanism 10 can be arranged in a driving relation with a toothed member such as shown at 66.

The drive mechanism 10 is particularly applicable to adjustable seat assemblies in vehicles and an embodiment of the invention is shown in FIG. 6 for this use and indicated generally at 80. The assembly 80 is like the assembly 55 in that it includes a plurality of electric motors 12 in a common housing 52b. Two of the motors 12 drive axial drive mechanisms 10 that are associated with planetary systems 40 that drive pinion gears 50 and the third drive mechanism 10 drives a gear system 81 that drives a pinion gear 82 on a shaft 84 mounted in a bearing support 86. The shaft 84 in turn drives an output gear 88.

In the assembly 80, two of the mechanisms 10 are used to adjust the seat in up and down directions and the third mechanism 10 is used to move the seat forward and back.

During operation of the mechanism 10, the rotating worm gear 16 drives the helical gears 32 so as to rotate the carrier 22 about the axis 15. Rotation of the carrier 22 results in rotation of the ring gear 38 which can be used to drive many different mechanisms. The ring gear 38 is used in FIG. 1 to drive the spur gears 42 which mesh with the stationary ring gear 48 to in turn drive the carrier 46 and rotate the output pinion gear 50 at a reduced speed relative to the speed of rotation of the drive shaft 14. The result is a compact axial drive mechanism which efficiently translates the high speed, low torque rotation of the electric motor shaft 14 into a low speed, high torque rotation of the output pinion gear 50 which can be effectively utilized in a variety of mechanism installations.

What is claimed is:

1. A drive mechanism which includes an electric motor having an output shaft, comprising a worm gear rotatable about an axis of rotation in a driven relation with said output shaft, a first set of helical planet gears arranged in a meshed relation with said worm gear, each of said helical gears of said first set having an axis of rotation inclined with respect to the axis of rotation of said worm gear at an angle of less than 90 degrees, a first carrier arranged in coaxial relation with said worm gear and in a supporting relation with said first set of helical planet gears, a first ring gear fixed on said first carrier in a coaxial relation with said output shaft, said first carrier having a first bore having a thrust surface and being coaxial with said worm gear axis of rotation which receives said worm gear and supports said worm gear through engagement between said worm gear and said thrust surface, and a second bore coaxial with said worm gear axis of rotation, a second set of planet spur gears positioned around and in a meshed relation with said first ring gear, a second carrier for said second set of planet spur gears having a third bore coaxial with said worm gear axis of rotation and an output pinion gear fixed on said second carrier and arranged in a coaxial relation with said worm gear, a second ring gear for said first and second sets of planet gears, and a housing for said assembly, said second ring gear being formed as a part of said housing and having radially inwardly directed teeth in meshing engagement with said first and second sets of planet gears and a spindle received by said second bore of said first carrier and received by said third bore of said second carrier for supporting said first and second carriers.

2. A drive mechanism according to claim 1 wherein the axes of rotation of said planet gears of said first set are inclined at an angle of substantially forty-five degrees with respect to the axis of said worm gear.

3. The drive mechanism according to claim 1 wherein said first carrier is of an irregular shape having an annular support portion on which said first set of helical planet gears are mounted and a central recessed portion which defines said second bore and extends in a direction axially away from said worm gear and terminates in an axial support for said first ring gear.

4. An axial drive mechanism comprising a worm gear having an axis of rotation and adapted to be driven about said axis, a planetary gear system having an axis that is the same as said gear axis, said system including a plurality of helical planet gears arranged in a meshed relation with said worm gear, each of said helical gears having an axis of rotation inclined with respect to said axis of rotation of said worm gear at an angle of less than 90 degrees, a carrier arranged in coaxial relation with said worm gear and in a supporting relation with said helical planet gears, said carrier having a first bore having a thrust surface and being coaxial with said worm gear axis of rotation which receives said worm gear and supports said worm gear through engagement between said worm gear and said thrust surface, and a second bore coaxial with said worm gear axis of rotation, and a ring gear fixed on said carrier in a coaxial relation therewith, a housing for said drive mechanism, a second ring gear fixed to said housing and in meshed relation with said helical planet gears, and a spindle received by said carrier second bore for supporting said carrier.

5. A drive mechanism according to claim 4 wherein said helical gear axis of rotation is inclined at an angle of substantially forty-five degrees to the axis of rotation of said worm gear.

* * * * *